Sept. 30, 1969   J. R. KENNEDY   3,469,637
SPRING TOOTH MOUNTING
Filed Dec. 27, 1966   3 Sheets-Sheet 1
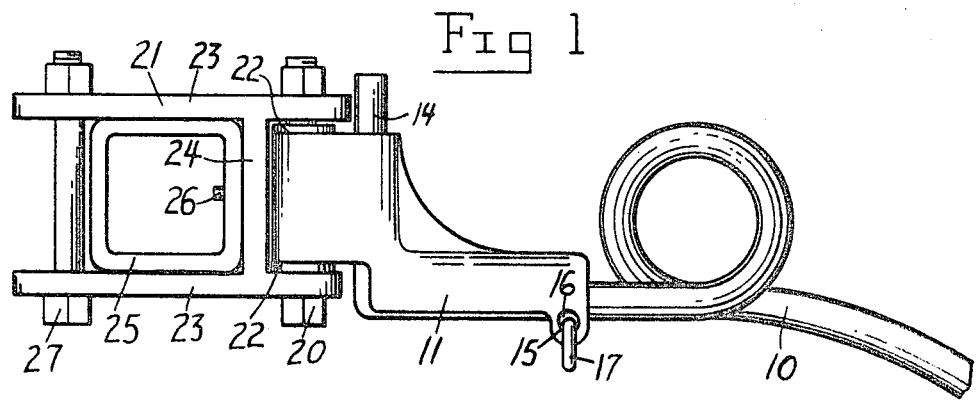
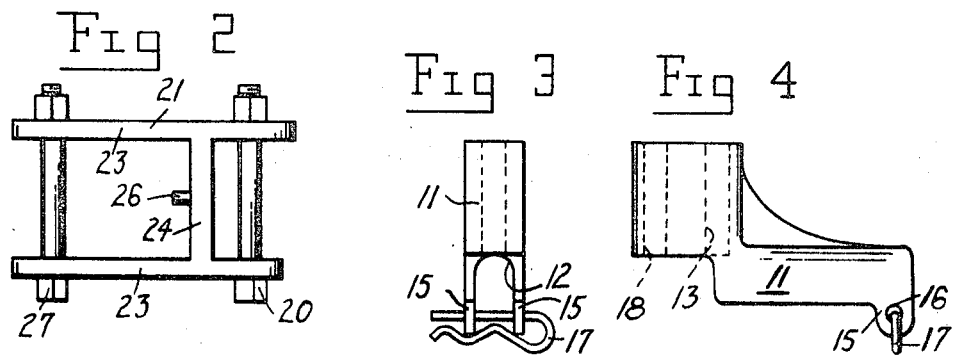
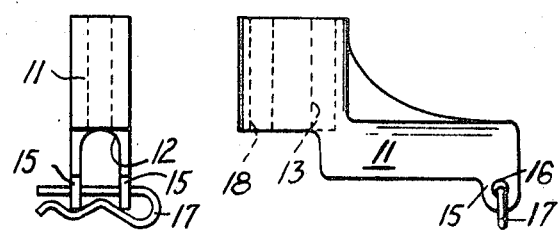
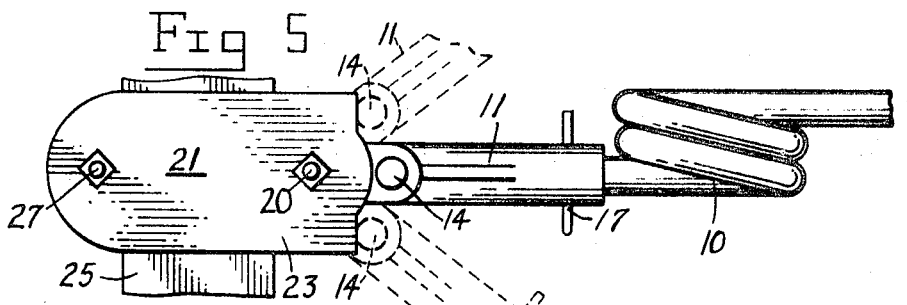
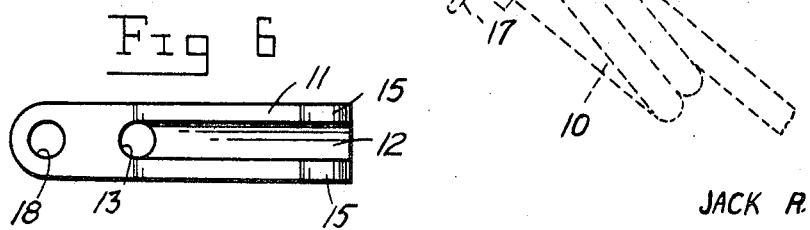
INVENTOR.
JACK R. KENNEDY
BY
*Wells & St. John*
ATTYS.

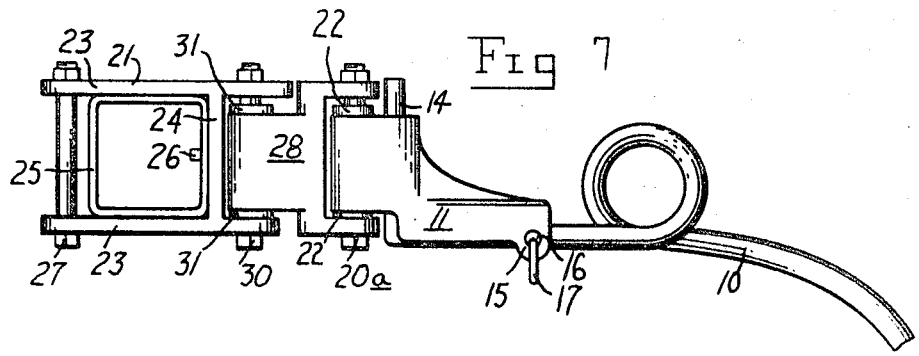
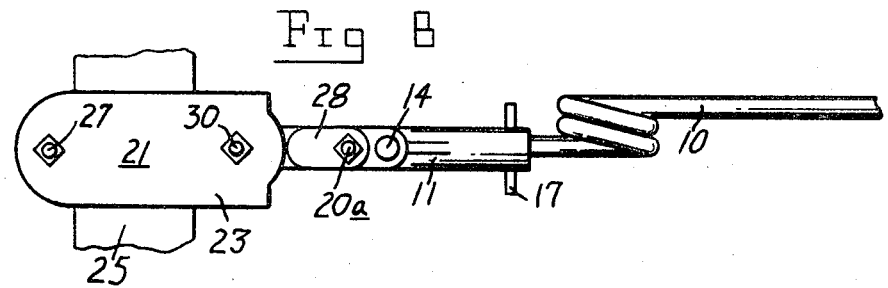
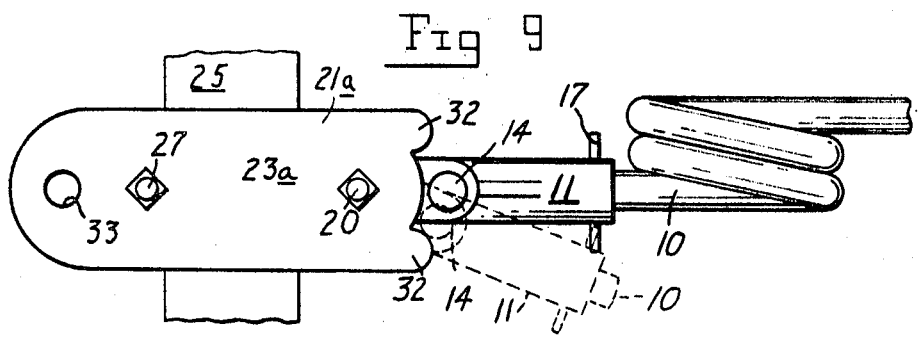
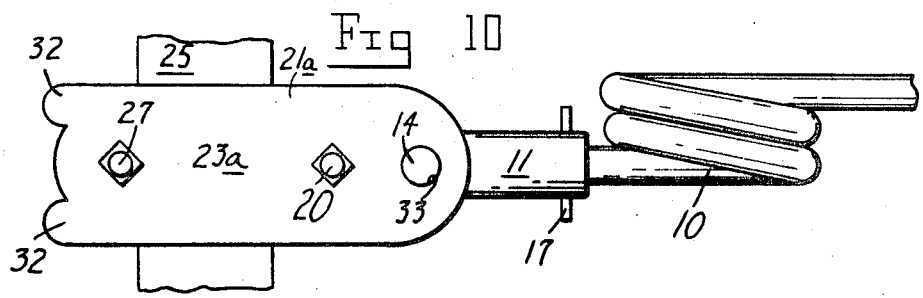

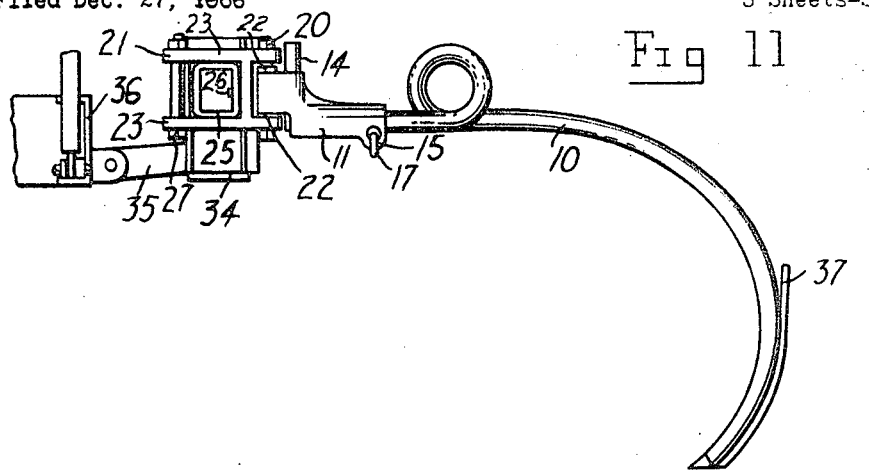
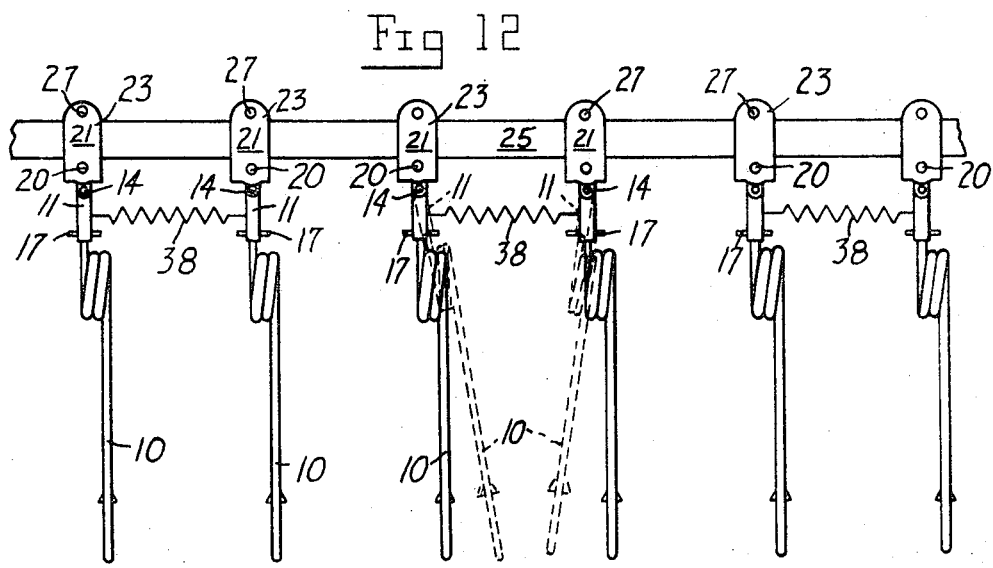
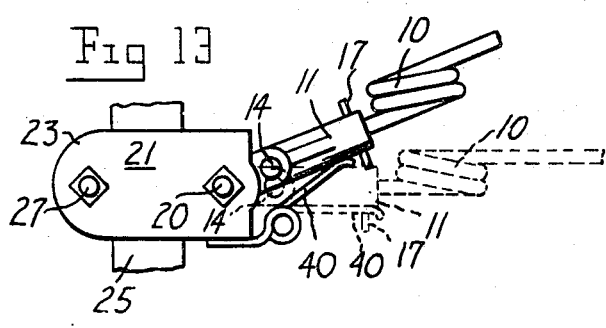

United States Patent Office 3,469,637
Patented Sept. 30, 1969

3,469,637
SPRING TOOTH MOUNTING
Jack R. Kennedy, % Kennedy Chemicals, Box 356,
Wilbur, Wash. 99185
Filed Dec. 27, 1966, Ser. No. 604,811
Int. Cl. A01b 39/20, 35/20, 25/00
U.S. Cl. 172—709                                    8 Claims

ABSTRACT OF THE DISCLOSURE

A mounting apparatus for a spring tooth of the type used in the application of liquid fertilizer. The mounting device comprises a bracket secured to a transverse tool bar and a specially designed casting pivotally connected to the bracket about a vertical axis. The casting includes a vertical aperture and an intersecting channel which respectively receives a vertical extension and horizontal portion of the bent shank of the spring tooth mounted thereby. Side biasing springs and a compound pivotal connection for the mounting are also disclosed.

---

This invention relates to a novel mounting for a spring tooth of the type used in the application of liquid fertilizer in agricultural programs.

It is now a common practice, in many areas, to apply liquid fertilizer through an open end tube leading rearwardly behind a spring tooth similar to the type of tooth used for cultivating agricultural crops. The difficulty in such application is that the fertilizer must be effectively applied in fields containing trash which normally interfere with proper soil penetration, causing the fertilizing unit to miss areas of the field, wasting the added growing efficiency possible by a fertilizer program.

The present apparatus provides a simple mounting device for carrying spring teeth as they are being trailed along by a supporting tool bar, the mounting arrangement permitting pivotal movement of the teeth about an upright axis. The mounting arrangement also permits, where desired, initial biasing of each tooth to insure that the tooth will move to the side and clear itself when contacted by field trash.

It is a first object of this invention to provide a mounting for a spring tooth in which the tooth can be easily and quickly fastened, preferably by selective engagement of a single pin. This permits the user of the mounting to interchange teeth when damaged and to replace them in the field without special tools.

Another object of this invention is to provide a mounting for pivotally carrying spring teeth about an upright axis with means to normally limit the amount of pivotal movement afforded to the mounting or even to eliminate such pivotal movement when so desired.

Another object of the invention is to provide increased pivotal freedom to a spring tooth so that the tooth is incapable of binding when encountering trash or other obstructions during field use.

These and further objects will be evident from the following disclosure, this disclosure being directed to the basic device plus several modifications thereof. Due to the versatility of the basic mounting, the scope of the invention is not to be limited by the examples illustrated, as it is set out in detail in the claims which follow.

In the drawings:

FIGURE 1 is a side elevation view showing the mounting of a spring tooth on a tool bar;

FIGURE 2 is a side elevation view of the mounting bracket;

FIGURE 3 is an end view of the casting that carries the spring tooth;

FIGURE 4 is a side elevation view of the casting as seen from the right in FIGURE 3;

FIGURE 5 is a plan view of the mounting arrangement as seen from the top in FIGURE 1 with the maximum pivoted positions of the casting shown in dashed lines;

FIGURE 6 is an enlarged view of the casting as seen from the bottom in FIGURE 1;

FIGURE 7 is a side elevation of a modified form of the invention;

FIGURE 8 is a plan view of the modified form as seen from the top of FIGURE 7;

FIGURE 9 is a plan view of a modified form of the mounting bracket with the maximum pivoted position of the spring tooth shown in dashed lines;

FIGURE 10 is a plan view similar to FIGURE 9 with the top plate of the bracket reversed;

FIGURE 11 is a side elevation view of the tool bar and spring tooth mounting arrangement;

FIGURE 12 is a plan view of the tool bar as seen from the top of FIGURE 11 showing the pivoted position of two of the spring teeth in dashed lines; and FIGURE 13 is an enlarged plan view of a single mounting for a spring tooth showing a modified biasing means with the normal position of the casting shown in dashed lines.

Referring now to the drawings, and specifically to FIGURES 1 through 6, a spring tooth is shown being carried in casting 11. The casting 11 is L-shaped and is provided with an inverted U-shaped channel 12 along its horizontal projection (FIGURES 3 and 6). Casting 11 is also provided with a vertical circular aperture 13 intersecting the forward end of channel 12 and designed to receive a vertical extension 14 of spring tooth 10. The circular aperture 13 positions the bent shank of spring tooth 10 in a vertical plane while channel 12 fixes the position of the shank in a horizontal plane. The trailing end of casting 11 is provided with a pair of downwardly projecting ears 15 which transversely straddle the channel 12. The ears 15 have apertures 16 formed therethrough, designed to carry a pin 17 which holds the bent shank of spring tooth 10 in the casting 11.

The vertical projection of casting 11 is also provided with a second vertical aperture 18 parallel to the aperture 13 (FIGURES 4 and 6). The respective axes of apertures 13 and 18 are parallel to one another. A bolt 20 extends through aperture 18 and a pair of coaxial apertures formed through rearwardly protruding ears at both the top and bottom of mounting bracket 21 and provides a pivot about which the casting 11 is free to swing. The casting 11 is separated from bracket 21 by means of washers 22 carried on bolt 20. The washers 22 are made of rust resistant material and serve to minimize frictional wear resulting from pivotal movement of casting 11 relative to bracket 21 about bolt 20.

The bracket 21 is cast as a single piece with top and bottom horizontal plates 23 being connected by a rear vertical plate 24. The rear edge of the top horizontal plate 23 limits pivotal movement of casting 11 (FIGURE 5). It serves as a stop selectively engageable by the swinging vertical extension 14 of spring tooth 10, which protrudes upwardly beyond casting 11.

The bracket 21 is located on a conventional tool bar 25 by a horizontal projection 26 which protrudes forwardly from plate 24. The projection 26 is designed to fit in one of a series of apertures provided along the tool bar 25. A bolt 27 between the forward ends of horizontal plates 23 clamps bracket 21 to the tool bar 25.

In operation a number of spring teeth 10 are pivotally carried on tool bar 25 in transversely aligned positions. Lateral movement of the brackets 21 is prevented by the horizontal projections 26 in suitably spaced complementary apertures along tool bar 25. The wheel supported frame (not shown) carrying tool bar 25 is pulled through the field to be fertilized by a conventional tractor. If during its forward movement a spring tooth 10 should contact an obstacle or become entangled in weeds or trash, the spring tooth and casting 11 are free to pivot about bolt 20 and pass around the obstruction, thus preventing damage to the spring tooth and always assuring proper soil penetration. The free pivot of casting 11 and spring plow teeth 10 about bolt 20 allows any slight unbalance of trash drag to cause the tooth to swing laterally, further increasing the unbalance and dumping the trash before it builds up and possibly injures adjacent crop rows. The tooth point extends forward much beyond the lodging point of the trash so that trash unbalance has greater leverage about bolt 20 than the tooth point in causing the tooth to swing sidewise and dump the trash.

FIGURES 7 and 8 show a modified form of this invention in which an intermediate link 28 is pivotally connected to casting 11 by means of a bolt 20a. The link 28 and casting 11 are separated from each other by washers 22 carried on bolt 20a. The link 28 is pivotally connected to bracket 21 by means of a bolt 30 received through a vertical aperture in the link 28 and apertures in both the top and bottom plates 23 of bracket 21. The link 28 and plates 23 are separated from each other by wear washers 31 carried on bolts 30 and located at the top and bottom of the link. The top and bottom horizontal plates 23 of bracket 21 serve to limit the pivotal movement of the link 28 as it swings into contact with these plates.

FIGURES 9 and 10 illustrate a modification to the mounting bracket 21 shown in FIGURES 1 through 6. A cover plate 23a is provided adjacent to the upper surface of plate 23, being fastened by bolts 20 and 27. One end of plate 23a has a pair of rearward ears 32 to limit the pivotal movement of the spring tooth 10 by engaging the upper end of the vertical section of the spring tooth shank 14 as can be seen in dashed lines in FIGURE 9. Located at the opposite end of horizontal plate 23a is a circular aperture 33. When plate 23a is reversed aperture 33 receives the spring tooth shank 14. When the shank 14 is located in aperture 33 the casting 11 and spring tooth 10 are prevented from pivoting about bolt 20.

In a typical installation tool bar 25 is carried by brackets 34 supported by forwardly projecting arms 35 (FIGURE 11). The arms 35 are pivotally mounted on a carrier frame 36 which is pulled by a tractor (not shown). The rear edge of the lower end of spring tooth 10 has fixed to it a hollow tube 37 which delivers liquid fertilizer to the soil by means of a connection to a storage tank carried on frame 36 (not shown).

FIGURE 12 illustrates a modification to the basic invention in which transversely adjacent pairs of castings 11 are connected by light tension springs 38. As trash builds up on the teeth 10, an unbalance of trash drag occurs and the spring teeth are caused to swing laterally toward each other by spring 38 as can be seen in dashed lines in FIGURE 12. Thus a larger opening is provided between pairs of spring teeth through which the trash can pass. The light spring pressure acts as a biasing force during trash buildup to insure pivotal motion to insure maximum clearance for the track.

FIGURE 13 illustrates a further modification of this invention. A light leaf spring 40 is shown fixed to a bracket 21. Spring 40 forces the casting 11 and spring tooth 10 to one side once the free pivoting has been unbalanced due to the drag of trash. The normal position of casting 11 and spring tooth 10 is shown in dashed lines in FIGURE 13. Again springs 40 will be mounted on opposite sides of adjacent spring teeth on the tool bar so as to bias the teeth in a manner similar to that previously explained.

The apparatus described provides a simple and inexpensive mounting for spring teeth such as are used in the application of liquid fertilizer and for other agricultural purposes. The greatest problem encountered in the use of such implements is the accumulation of trash along the front surfaces of the tooth at the ground line. If permitted to build up without control, such trash can seriously affect the uniformity of soil penetration and the efficiency of the fertilizer application. To counteract this in the past, it has been found necessary to use rearward or forward extensions for alternate spring teeth, rather than to mount the teeth in transversely aligned positions. However, a transverse row of spring teeth as illustrated in FIGURE 12 has the distinct advantage of insuring that uniform leverage is applied to the point of each tooth, in contrast to the differing leverage exerted through a tool bar and alternate extensions. I have found that the use of the freely pivotable mounting as shown in the accompanying drawings permits one to utilize such spring teeth in transversely aligned positions and to counteract successfully the accumulation of trash along the spring tooth surfaces. Where trash is an exceptionally difficult problem, prebiasing of the teeth as illustrated in FIGURES 12 and 13 serves to further overcome this obstacle. In addition, the novel bracket described above permits accurate positioning of each tooth due to the utilization of projection 26, which accurately places each mounting in its proper transverse position along the tool bar. Furthermore, the shank of the tooth is almost instantly mountable or demountable by release of pin 17, which is the only restraining member for the tooth which requires manipulation in order to free the tooth from casting 11. This permits the user of the apparatus to replace or repair the tooth in the field without any special tools and with little skill, correct vertical and horizontal alignment of the tooth being assured by the design of the casting 11.

Many changes might be made in the design of the apparatus without deviating from the intended scope of the invention.

Having thus described my invention, I claim:

1. In a mounting for a spring tooth of the type used in the application of liquid fertilizer, each spring tooth having a shank including a horizontal rear section and a substantially perpendicular vertical section bent upwardly therefrom;

a transverse tool bar;

a rigid bracket fixed to said tool bar;

and a casting pivotally connected to said bracket about a first vertical axis and extending rearwardly from said axis, said casting including clamp means to releasably engage both the horizontal and vertical sections of a shank of a spring tooth against the casting, the vertical section thereof being located parallel to and rearward of said first axis and the horizontal rear section thereof being abutted along its upper surface thereof by said casting.

2. A mounting as set out in claim 1 wherein the casting comprises:

a downwardly open horizontal channel formed along the lower edge of the casting extending continuously to the rear end of the casting, the cross sectional configuration of the channel being complementary to the cross sectional configuration of the horizontal rear section of the spring tooth shank;

a vertical aperture extending through said casting and intersecting the front end of the channel, the cross sectional configuration of the vertical aperture being complementary to the cross sectional configuration of the vertical section of the spring tooth shank;

and releasable means engageable with the casting across the channel to selectively prevent movement relative to the casting of a spring tooth shank located in said channel and aperture.

3. A mounting as defined in claim 2 wherein said last named means comprises a locking pin received through aligned transverse apertures formed through the casting adjacent the rear end thereof.

4. A mounting as set out in claim 1 further comprising:

biasing means operatively connected to said casting to exert a light pressure thereon urging the casting to pivot relative to said bracket in one angular direction so as to move the casting and tooth carried thereby from a normal longitudinal working position.

5. A mounting as set out in claim 4 wherein said biasing means comprises a light tension spring having its ends connected to the castings of transversely adjacent mountings on said tool bar at locations rearward of the respective first pivotal axes thereof.

6. A mounting as set out in claim 4 wherein said biasing means comprises a leaf spring anchored to said bracket with a movable portion thereof engaged with one side surface of said casting at a location rearward of the axis of said casting on said bracket.

7. A mounting as set out in claim 1 wherein said casting comprises two sections extending rearwardly from said bracket, said sections being pivotally connected to one another about a second vertical axis located rearwardly of and parallel to said first vertical axis.

8. A mounting as set out in claim 1 wherein the outer end of the vertical section of the tooth shank protrudes from said casting; and abutment means on said bracket in the pivotal path of the outer end of the vertical section of the tooth shank about said first axis to limit the extent of such pivotal movement.

References Cited

UNITED STATES PATENTS

| | | | |
|---|---|---|---|
| 794,751 | 7/1905 | Sobey | 172—657 X |
| 1,068,977 | 7/1913 | Bugler | 172—709 X |
| 1,767,162 | 6/1930 | Yackley | 172—657 X |
| 2,931,446 | 4/1960 | Gwinn | 172—748 X |
| 3,191,689 | 6/1965 | Van der Lely | 172—707 X |
| 3,266,579 | 8/1966 | Hofer | 172—657 X |
| 3,294,181 | 12/1966 | Binder | 172—708 |

ROBERT E. BAGWILL, Primary Examiner

ALAN E. KOPECKI, Assistant Examiner

U.S. Cl. X.R.

172—643, 658, 707